US012266455B2

(12) United States Patent
Lee

(10) Patent No.: US 12,266,455 B2
(45) Date of Patent: Apr. 1, 2025

(54) ELECTRICAL WIRE HAVING LEAKAGE CURRENT LIMITING FUNCTION

(71) Applicant: VISION TECH Corporation, Busan (KR)

(72) Inventor: Ho Seok Lee, Busan (KR)

(73) Assignee: VISION TECH CORPORATION, Busan (KR)

( * ) Notice: Subject to any disclaimer, the term of this patent is extended or adjusted under 35 U.S.C. 154(b) by 152 days.

(21) Appl. No.: 18/224,565

(22) Filed: Jul. 20, 2023

(65) Prior Publication Data

US 2024/0282487 A1 Aug. 22, 2024

(30) Foreign Application Priority Data

Feb. 16, 2023 (KR) ........................ 10-2023-0020447

(51) Int. Cl.
*H01B 17/00* (2006.01)
*H01B 17/42* (2006.01)

(52) U.S. Cl.
CPC ........... *H01B 17/005* (2013.01); *H01B 17/42* (2013.01)

(58) Field of Classification Search
CPC ........ H01B 7/32; H01B 9/028; H01B 17/005; H01B 17/42
See application file for complete search history.

(56) References Cited

U.S. PATENT DOCUMENTS 5,807,447 A * 9/1998 Forrest ................... H01B 9/028 174/105 R
5,864,094 A * 1/1999 Griffin ................... H01B 11/12 174/105 R
8,624,109 B2 * 1/2014 Traeholt ................. H02G 15/34 174/15.5
8,688,182 B2 * 4/2014 Soika ..................... H01B 12/06 505/231
2003/0183410 A1 * 10/2003 Sinha ..................... H01B 12/06 174/68.1
2004/0138066 A1 * 7/2004 Sinha ..................... H01B 12/02 505/231
2010/0307811 A1 * 12/2010 Griffin ................... H01B 11/12 174/350
2012/0252677 A1 * 10/2012 Soika ..................... H01B 12/06 29/599

(Continued)

FOREIGN PATENT DOCUMENTS

KR 20-1985-0002423 Y1 10/1985
KR 10-2012-0113187 A 10/2012
KR 10-1625493 B1 5/2016

OTHER PUBLICATIONS

Non-final Office Action mailed Nov. 28, 2024 from the Korean Patent Office for Application No. 10-2023-0020447.

*Primary Examiner* — Timothy J Thompson
*Assistant Examiner* — Rhadames Alonzo Miller
(74) *Attorney, Agent, or Firm* — Insight Law Group, PLLC; Seung Lee

(57) ABSTRACT

The present disclosure relates to an electrical wire having a leakage current limiting function, in which, since a neutral line is provided to have a greater cross-sectional area than that of a phase voltage line, a leakage current leaking from the phase voltage line may be limited, and thus the risk of electric shock to the human body due to the leakage current may be minimized.

5 Claims, 4 Drawing Sheets

(56) References Cited

U.S. PATENT DOCUMENTS

| | | | | |
|---|---|---|---|---|
| 2013/0192891 | A1* | 8/2013 | Davis | F21V 21/12 248/58 |
| 2015/0194804 | A1* | 7/2015 | An | H01R 9/2483 307/326 |

* cited by examiner

ELECTRICAL WIRE HAVING LEAKAGE CURRENT LIMITING FUNCTION

CROSS-REFERENCE TO RELATED APPLICATION

This application claims priority to and the benefit of Korean Patent Application No. 10-2023-0020447 filed on Feb. 16, 2023, the disclosure of which is incorporated herein by reference in its entirety.

BACKGROUND

1. Field of the Invention

The present disclosure relates to an electrical wire for supplying power to a load, and more particularly, to an electrical wire having a leakage current limiting function.

2. Discussion of Related Art

Korean Patent Registration No. 10-1625493 (published on May 30, 2016) previously filed and registered by the applicant of the present disclosure discloses that a leakage current decreases as an area ratio difference between two flat conductors increases. This technology prevents electric shock by limiting the leakage current by using an area difference between conductor electrodes.

The present inventor has studied a technology capable of limiting a leakage current leaking from a phase voltage line by providing a neutral wire to have a larger cross-sectional area than the phase voltage line of an electrical wire that transmits power.

RELATED ART DOCUMENT

[Patent Document]

Korean Patent Registration No. 10-1625493 (published on May 30, 2016)

SUMMARY OF THE INVENTION

The present disclosure is directed to providing an electrical wire having a leakage current limiting function, which may limit a leakage current leaking from a phase voltage line by providing a neutral line to have a greater cross-sectional area than that of the phase voltage line.

An electrical wire having a leakage current limiting function includes a first phase voltage line (R line) having a circular cross section, through which a first phase current flows, a neutral line (N line) having an annular cross section, which is provided to surround the first phase voltage line from an outside while spaced apart from the first phase voltage line such that the neutral line has a greater cross-sectional area than that of the first phase voltage line to limit a leakage current leaking from the first phase voltage line, and an insulator molding part that electrically insulates the first phase voltage line (R line) and the neutral line (N line) by molding the first phase voltage line (R line) and the neutral line (N line).

The electrical wire may further include a ground line (G line) connected to the ground.

The electrical wire may further include a second phase voltage line (S line) which is spaced apart from the first phase voltage line, is provided inside the neutral line while spaced apart from the neutral line, and has a smaller cross-sectional area than that of the neutral line.

The electrical wire may further include a third phase voltage line (T line) which is spaced apart from the first phase voltage line and the second phase voltage line, is provided inside the neutral line while spaced apart from the neutral line, and has a smaller cross-sectional area than that of the neutral line.

The electrical wire may further include an insulating sheath that surrounds an outside of the insulator molding part to shield and protect an inside thereof.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
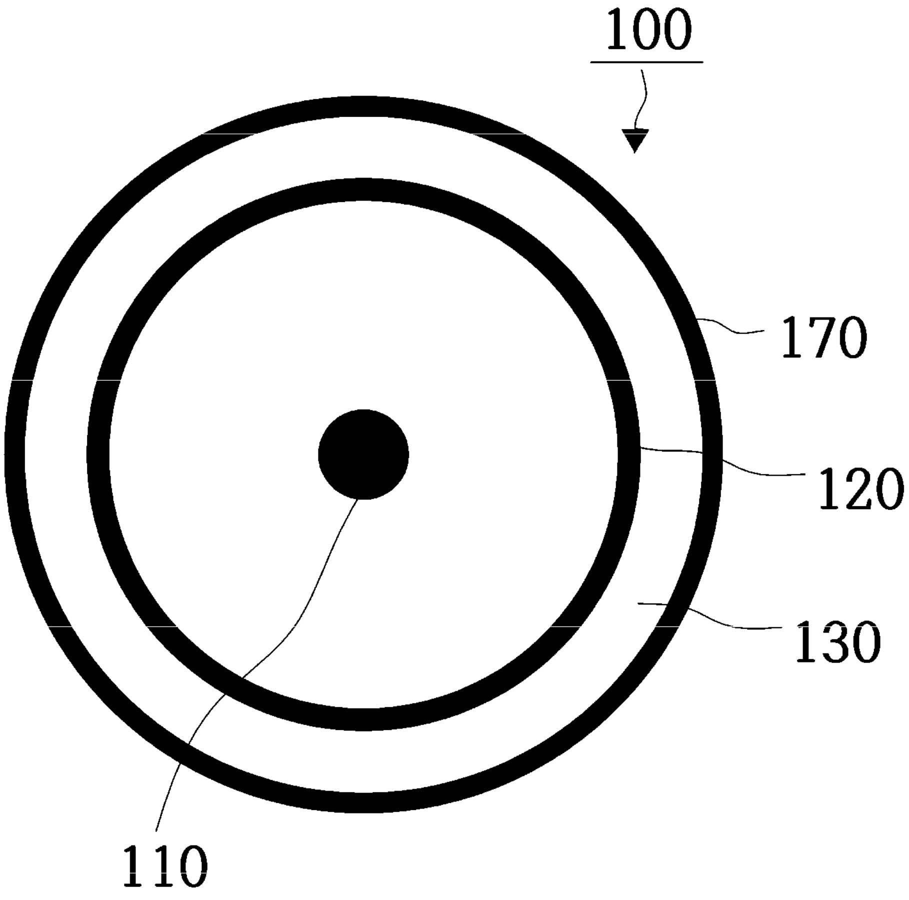
FIG. 1 is a cross-sectional view illustrating a configuration of an electrical wire having a leakage current limiting function according to an embodiment of the present disclosure.

Hereinafter, the present disclosure will be described in detail so that those skilled in the art may easily understand and reproduce the present disclosure through exemplary embodiments described with reference to the accompanying drawings. Although specific embodiments are illustrated in the drawings and related detailed descriptions are made, the embodiments and descriptions are not intended to limit various embodiments of the present disclosure to any particular form.

In the description of the present disclosure, when it is determined that the detailed description of related widely known functions or configurations may make the subject matter of the embodiments of the present disclosure unclear, the detailed description will be omitted.

It should be understood that, when it is mentioned that a first component is "connected" or "coupled" to a second component, the first component may be directly connected or coupled to the second component, or a third component may be present between the first component and the second component.

On the other hand, it should be understood that, when a first component is "directly connected" or "directly coupled" to a second component, a third component is not present therebetween.

FIG. 1 is a cross-sectional view illustrating a configuration of an electrical wire having a leakage current limiting function according to an embodiment of the present disclosure and illustrates a single-phase two-wire electrical wire. As illustrated in FIG. 1, an electrical wire 100 having a leakage current limiting function according to an embodiment includes a first phase voltage line (R line) 110, a neutral line (N line) 120, and an insulator molding part 130.

The first phase voltage line (R line) 110 is a conductor line having a circular cross section, through which a first phase current (R phase current) flows, and is electrically connected to a R phase voltage line terminal (not illustrated) such as a commercial alternating current (AC) power system, a load, an electrical outlet, and a plug.

The neutral line (N line) 120 is a conductor line having an annular cross section, which is implemented to surround the first phase voltage line 110 from the outside while spaced apart from the first phase voltage line 110, and is electrically connected to a neutral line terminal (not illustrated) such as an AC power system, a load, an electrical outlet, and a plug.

In this case, the neutral line 120 has a larger cross-sectional area than the first phase voltage line 110, thereby limiting a leakage current leaking from the first phase voltage line 110. As the cross-sectional area of the neutral line 120 becomes greater than the cross-sectional area of the first phase voltage line 110, the current leaking from the first phase voltage line 110 becomes smaller, and as the leaked current becomes smaller, the risk of electric shock becomes smaller. Thus, the risk of electric shock to the human body due to the leakage current can be minimized.

The reason for this, as disclosed in Korean Patent Registration No. 10-1625493 (published on May 30, 2016), is that the leakage current gradually decreases as the area of the flat plate-shaped conductor (corresponding to the neutral line of the present disclosure) connected to a negative terminal becomes greater than an area of the flat plate-shaped conductor (corresponding to the first phase voltage line of the present disclosure) connected to a positive terminal of a power source.

The insulator molding part 130 electrically insulates the first phase voltage line (R line) 110 and the neutral line (N line) 120 by molding the first phase voltage line (R line) 110 and the neutral line (N line) 120. In a state in which the insulator molding part 130 is damaged and the first phase voltage line (R line) 110 and the neutral line (N line) 120 are exposed to the outside, when the electrical wire 100 having a leakage current limiting function is flooded and submerged in water, a current leaks through the first phase voltage line 110 at a portion that is exposed to the outside and submerged in the water, and the current flows through the first phase voltage line 110, the water, and the neutral line 120 in this order.

In this case, the current leaking from the first phase voltage line 110 does not flow to the human body (not illustrated) having a relatively very high resistance but flows to the neutral line 120 having a relatively low resistance through the water, and accordingly, the flow of the leakage current to the human body is limited. Thus, the risk of electric shock to the human body is minimized.

By this implementation, according to the present disclosure, the leakage current leaking from the phase voltage line may be limited during flooding as the neutral line is provided to have a larger cross-sectional area than that of the phase voltage line. Thus, the risk of electric shock to the human body due to the leakage current can be minimized.

Figure 2:
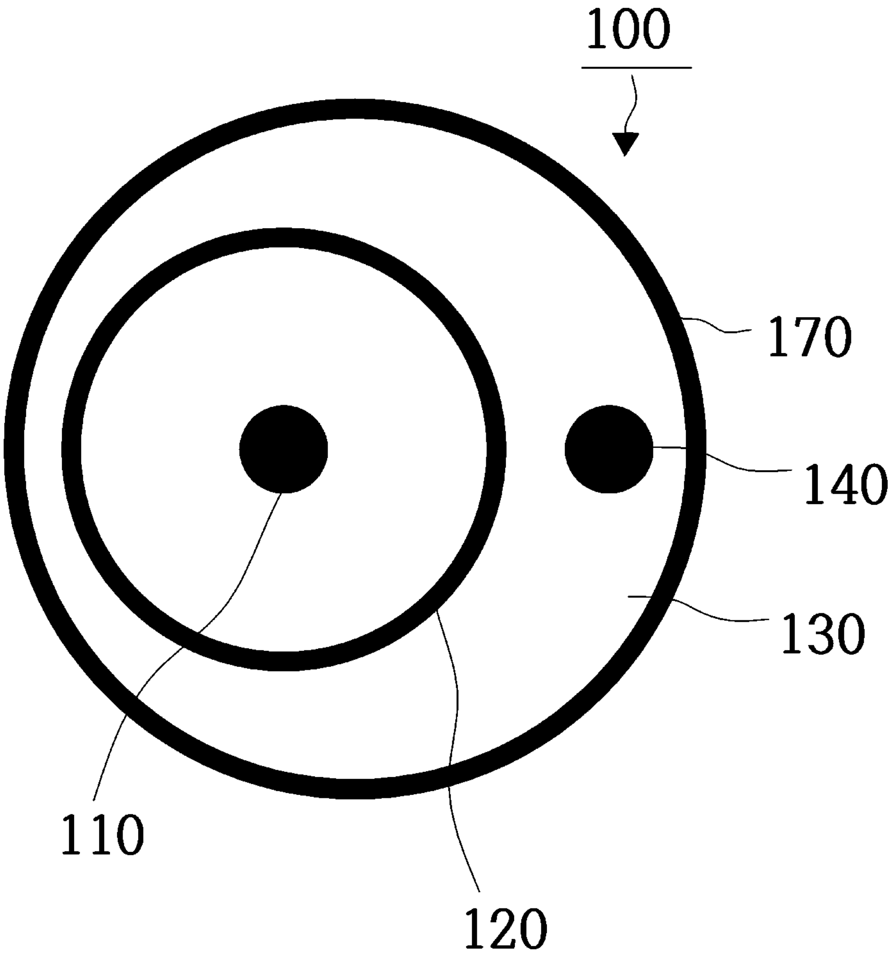
FIG. 2 is a cross-sectional view illustrating a configuration of an electrical wire having a leakage current limiting function according to another embodiment of the present disclosure.

FIG. 2 is a cross-sectional view illustrating a configuration of an electrical wire having a leakage current limiting function according to another embodiment of the present disclosure and illustrates a single-phase two-wire electrical wire provided with a ground. As illustrated in FIG. 2, the electrical wire 100 having a leakage current limiting function according to an embodiment further includes a ground line (G line) 140.

The ground line (G line) 140 is a conductor line having a circular cross section and connected to the ground and is implemented to be electrically spaced apart from the neutral line 120 outside the neutral line 120 having an annular cross section. In a non-flooded state, when an excessive current occurs due to an electrical leakage, a short circuit, or the like, the current flows to the ground through the ground line 140, and thus the human body and the electrical wire can be protected.

Figure 3:
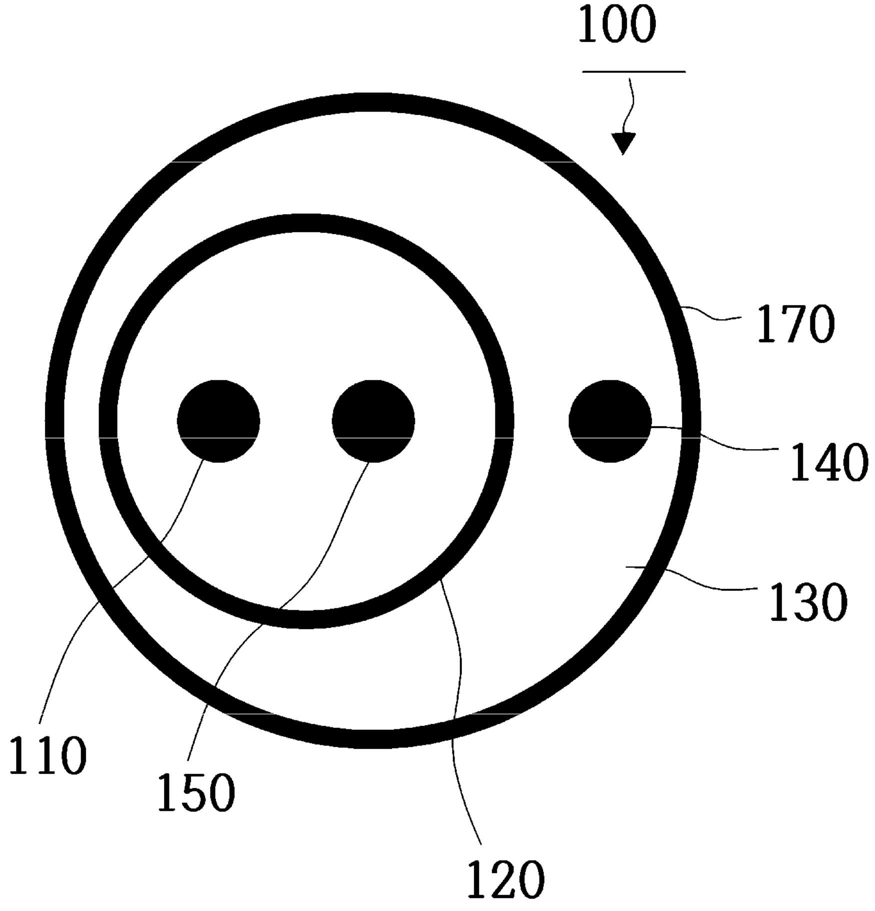
FIG. 3 is a cross-sectional view illustrating a configuration of an electrical wire having a leakage current limiting function according to still another embodiment of the present disclosure.

FIG. 3 is a cross-sectional view illustrating a configuration of an electrical wire having a leakage current limiting function according to still another embodiment of the present disclosure and illustrates a two-phase three-wire electrical wire provided with a ground. As illustrated in FIG. 3, the electrical wire 100 having a leakage current limiting function according to the embodiment further includes a second phase voltage line (S line) 150.

The second phase voltage line (S line) 150 is a conductor line which is spaced apart from the first phase voltage line 110, is provided inside the neutral line 120 while spaced apart from the neutral line 120, and has a smaller cross section than that of the neutral line 120 and is electrically connected to an S-phase voltage line terminal (not illustrated) such as the commercial AC power system, the load, the electrical outlet, and the plug.

In a state in which the insulator molding part 130 is damaged and the second phase voltage line (S line) 150 and the neutral line (N line) 120 are exposed to the outside, when the electrical wire 100 having a leakage current limiting function is flooded and submerged in water, the current leaks through the second phase voltage line 150 at a portion that is exposed to the outside and submerged in the water, and the current flows through the second phase voltage line 150, the water, and the neutral line 120 in this order.

In this case, the current leaking from the second phase voltage line 150 does not flow to the human body (not illustrated) having a relatively very high resistance but flows to the neutral line 120 having a relatively low resistance through the water, and accordingly, the flow of the leakage current to the human body is limited. Thus, the risk of electric shock to the human body is minimized.

Figure 4:
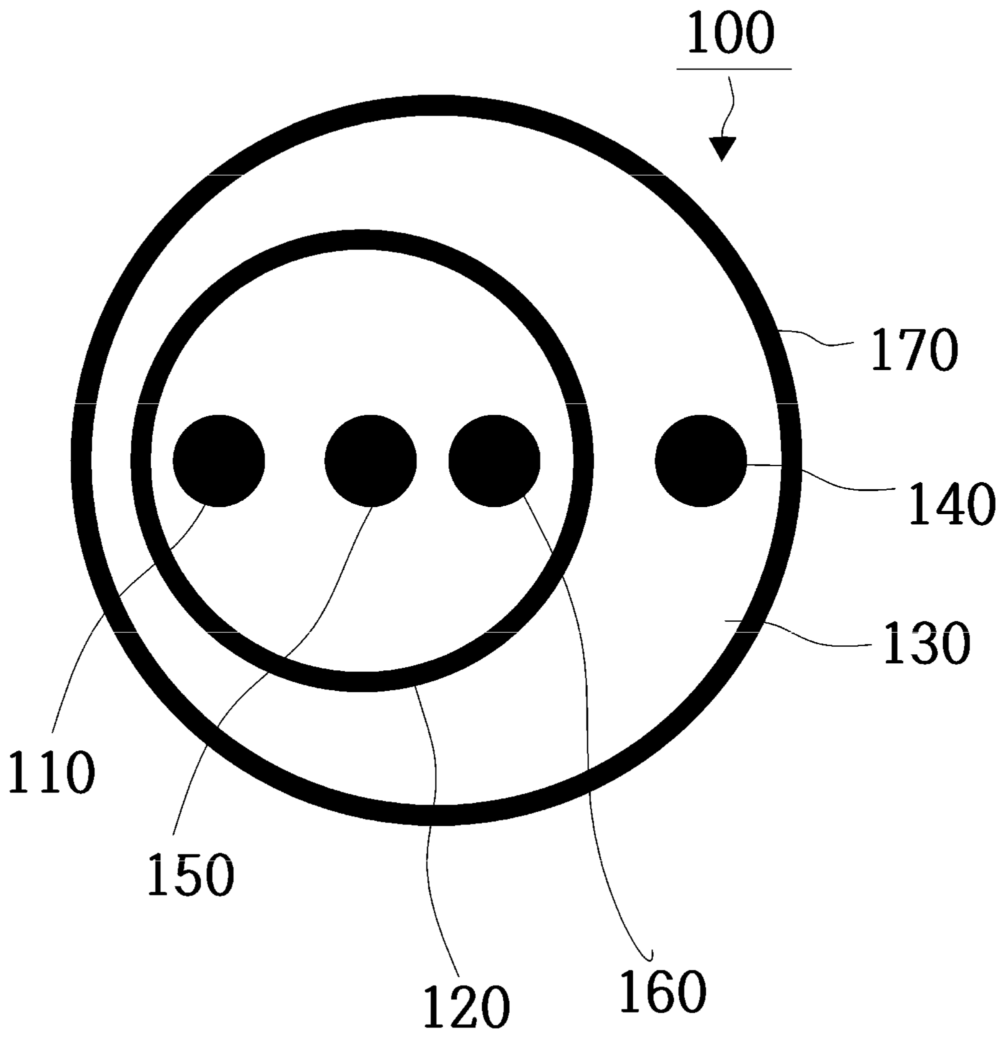
FIG. 4 is a cross-sectional view illustrating a configuration of an electrical wire having a leakage current limiting function according to yet another embodiment of the present disclosure.

FIG. 4 is a cross-sectional view illustrating a configuration of an electrical wire having a leakage current limiting function according to yet another embodiment of the present disclosure and illustrates a three-phase four-wire electrical wire provided with a ground. As illustrated in FIG. 4, the electrical wire 100 having a leakage current limiting function according to the embodiment further includes a third phase voltage line (T line) 160.

The third phase voltage line (T line) 160 is a conductor line which is spaced apart from the first phase voltage line 110 and the second phase voltage line 150, is provided inside the neutral line 120 while spaced apart from the neutral line 120, and has a smaller cross section than that of the neutral line 120 and is electrically connected to a T-phase voltage line terminal (not illustrated) such as an AC power system, a load, an electrical outlet, and a plug.

In a state in which the insulator molding part 130 is damaged and the third phase voltage line (T line) 160 and the neutral line (N line) 120 are exposed to the outside, when the electrical wire 100 having a leakage current limiting function is flooded and submerged in water, the current leaks through the third phase voltage line 160 at a portion that is exposed to the outside and submerged in the water, and the current flows through the third phase voltage line 160, the water, and the neutral line 120 in this order.

In this case, the current leaking from the third phase voltage line 160 does not flow to the human body (not illustrated) having a relatively very high resistance but flows to the neutral line 120 having a relatively low resistance through the water, and accordingly, the flow of the leakage current to the human body is limited. Thus, the risk of electric shock to the human body is minimized.

Meanwhile, according to an additional aspect of the present disclosure, the electrical wire 100 having a leakage current limiting function may further include an insulating sheath 170. The insulating sheath 170 surrounds an outside of the insulator molding part 130 to shield and protect an inside thereof.

By this implementation, according to the present disclosure, the insulating sheath 170 may surround the outside of the insulator molding part 130 to shield and protect the phase voltage lines, the neutral line, and the ground line thereinside, thereby improving stability.

As described above, according to the present disclosure, since the leakage current leaking from the phase voltage line may be limited by providing the neutral line to have a greater cross-sectional area than that of the phase voltage line, the risk of electric shock to the human body due to the leakage current may be minimized, and thus the purpose of the prevent disclosure above-presented can be achieved.

According to the present disclosure, a leakage current leaking from a phase voltage line can be limited by providing a neutral line to have a larger cross-sectional area than that of the phase voltage line. Thus, the risk of electric shock to the human body due to the leakage current can be minimized.

Various embodiments disclosed in the present specification and the drawings are merely presented as specific examples to help understanding and are not intended to limit the scope of various embodiments of the present disclosure.

Thus, it should be interpreted that the scope of various embodiments of the present disclosure includes all changes or modifications derived based on the technical spirit of various embodiments of the present disclosure in addition to the embodiments described herein.

What is claimed is:

1. An electrical wire having a leakage current limiting function, the electrical wire comprising:

a first phase voltage line (R line) having a circular cross section, through which a first phase current flows;

a neutral line (N line) having an annular cross section, which is provided to surround the first phase voltage line from an outside while spaced apart from the first phase voltage line and limits a leakage current leaking from the first phase voltage line by having a greater cross-sectional area than that of the first phase voltage line; and an insulator molding part configured to electrically insulate the first phase voltage line (R line) and the neutral line (N line) by molding the first phase voltage line (R line) and the neutral line (N line).

2. The electrical wire of claim 1, further comprising:

a ground line (G line) connected to the ground.

3. The electrical wire of claim 1, further comprising:

a second phase voltage line (S line) which is spaced apart from the first phase voltage line, is provided inside the neutral line while spaced apart from the neutral line, and has a smaller cross-sectional area than that of the neutral line.

4. The electrical wire of claim 3, further comprising:

a third phase voltage line (T line) which is spaced apart from the first phase voltage line and the second phase voltage line, is provided inside the neutral line while spaced apart from the neutral line, and has a smaller cross-sectional area than that of the neutral line.

5. The electrical wire of claim 4, further comprising:

an insulating sheath configured to surround an outside of the insulator molding part to shield and protect an inside thereof.

* * * * *